United States Patent
Yamauchi et al.

(10) Patent No.: US 7,936,860 B2
(45) Date of Patent: May 3, 2011

(54) X-RAY CONDENSING METHOD AND ITS DEVICE USING PHASE RESTORATION METHOD

(75) Inventors: Kazuto Yamauchi, Suita (JP); Hidekazu Mimura, Suita (JP); Hiromi Okada, Kobe (JP)

(73) Assignees: JTEC Corporation, Kobe-Shi (JP); Osaka University, Suita-Shi (JP)

( * ) Notice: Subject to any disclaimer, the term of this patent is extended or adjusted under 35 U.S.C. 154(b) by 112 days.

(21) Appl. No.: 12/440,121

(22) PCT Filed: Dec. 27, 2007

(86) PCT No.: PCT/JP2007/075132
§ 371 (c)(1),
(2), (4) Date: Mar. 5, 2009

(87) PCT Pub. No.: WO2008/081873
PCT Pub. Date: Jul. 10, 2008

(65) Prior Publication Data
US 2010/0183122 A1    Jul. 22, 2010

(30) Foreign Application Priority Data

Dec. 28, 2006   (JP) ................................. 2006-357566

(51) Int. Cl.
*G21K 1/06* (2006.01)
*G01D 18/00* (2006.01)
*G01N 23/04* (2006.01)
(52) U.S. Cl. ............................. 378/84; 378/62; 378/207
(58) Field of Classification Search ..................... 378/36, 378/43, 62, 84, 207
See application file for complete search history.

(56) References Cited

U.S. PATENT DOCUMENTS 4,429,953 A * 2/1984 Zehnpfennig et al. ........ 359/846
6,014,423 A * 1/2000 Gutman et al. .................. 378/85
(Continued)

FOREIGN PATENT DOCUMENTS

JP        8-271697        10/1996
(Continued)

OTHER PUBLICATIONS

H. Yumoto, et al.; "At-wavelength figure metrology of hard x-ray focusing mirrors;" Review of Scientific Instruments; vol. 77 063712; Jun. 30, 2006; 6 Sheets.

(Continued)

*Primary Examiner* — Edward J Glick
*Assistant Examiner* — Thomas R Artman
(74) *Attorney, Agent, or Firm* — Kratz, Quintos & Hanson, LLP (57) ABSTRACT

An X-ray condensing method and its device are provided with an X-ray mirror that has a wavefront adjustable function to finely adjust a wavefront of a reflecting X-ray, measure an X-ray intensity distribution in the vicinity of a focus, measure an X-ray intensity distribution in the vicinity of the X-ray mirror or use a known X-ray intensity distribution of an incident X-ray, calculate a complex amplitude distribution at the reflective surface by using a phase restoration method from the X-ray intensity distribution in the vicinity of the focus and the X-ray intensity distribution in the vicinity of the reflective surface, calculate a wavefront aberration of an X-ray condensing optical system from the complex amplitude distribution, and control the reflective surface of the X-ray mirror with the wavefront adjustable function so that the wavefront aberration is minimized.

9 Claims, 8 Drawing Sheets

U.S. PATENT DOCUMENTS

| | | | |
|---|---|---|---|
| 6,041,099 A * | 3/2000 | Gutman et al. | 378/85 |
| 6,266,389 B1 * | 7/2001 | Murayama et al. | 378/34 |
| 6,555,828 B1 * | 4/2003 | Bokor et al. | 250/492.2 |
| 6,803,994 B2 * | 10/2004 | Margeson | 355/53 |
| 6,842,500 B1 * | 1/2005 | Komatsuda et al. | 378/34 |
| 6,847,433 B2 * | 1/2005 | White et al. | 355/72 |
| 6,897,940 B2 * | 5/2005 | Sogard | 355/55 |
| 7,403,593 B1 * | 7/2008 | He et al. | 378/85 |
| 7,572,019 B2 * | 8/2009 | Novak | 359/849 |
| 7,628,497 B2 * | 12/2009 | Yamamoto et al. | 359/846 |

FOREIGN PATENT DOCUMENTS

| | | |
|---|---|---|
| JP | 10-284368 | 10/1998 |
| JP | 2000-294488 | 10/2000 |
| JP | 2001-272358 A1 | 10/2001 |

OTHER PUBLICATIONS

K. Yamauchi, et al.; "Development of the Measurement System with Interferometers for Ultraprecise X-ray Mirror;" Journal of the Japan Society of Precision Engineering; vol. 69; No. 6; Jun. 5, 2003; pp. 856-860 and end-sheet. (6 Sheets total)/Discussed at p. 6.

S. Matsuyama, et al.; "Diffraction-limited two-dimensional hard-x-ray focusing at the 100 nm level using a Kirkpartick-Baez mirror arrangement;" Review of Scientific Instruments; vol. 76 083114; 2005; 5 Sheets.

International Search Report for International Application No. PCT/JP2007/075132 dated Jan. 21, 2008.

* cited by examiner

X-RAY CONDENSING METHOD AND ITS DEVICE USING PHASE RESTORATION METHOD

TECHNICAL FIELD

The present invention relates to an X-ray condensing method and its device using a phase restoration method, and more specifically relates to an X-ray condensing method and its device in which a shape error distribution of a focusing mirror is calculated by the phase restoration method from an X-ray focused intensity distribution and an X-ray focusing optical system is finely adjusted using the shape error distribution to focus light.

BACKGROUND ART

In various wavelength ranges from soft X-rays to hard X-rays in a third-generation light radiation facility represented by the SPring-8, it has become possible to use X-rays having characteristics of high brightness, low emittance, and high coherence. This has significantly improved sensitivity and spatial resolution of various analyses such as a fluorescent X-ray analysis, photoemission spectroscopy, and X-ray diffraction. Such X-ray analyses or X-ray microscopy using the light radiation not only exhibit high sensitivity and high resolution but also enable nondestructive observation, and therefore are currently expected to be used in fields such as medicine, biology, and material science.

In the light radiation facility, a focused X-ray nanobeam is necessary for adding the high spatial resolution to various analysis techniques using an X-ray. In an X-ray nanobeam formation, a focusing optical device employing a method using a reflective mirror is recognized as most advantageous due to high brightness and no chromatic aberration. As a focusing optical system using a reflective mirror, a Kirkpatrick and Baez (K-B) mirror is generally used (see Patent Document 1).

In order to perform a good focusing, it is necessary to prepare a focusing mirror with high accuracy. The focusing mirror is manufactured by processing a block of silicon single crystal into a predetermined shape using a conventional method, and then performing a finish processing with ultra-precision using a numerically controlled elastic emission machining (EEM). The accuracy of the focusing mirror manufactured by this process greatly depends on the accuracy of a surface shape measurement before the processing. The inventors of the present invention have proposed a microstitching interferometry (MSI) in Non-Patent Document 1, and have already established a system of measuring with high accuracy the shape of an X-ray mirror with a measurement reproducibility of less than or equal to 1 nm in PV value in all spatial wavelength ranges. Further, as a system that enables measurement of a curved surface having a large curvature, a relative angle determinable stitching interferometry (RADSI) has been completed. A measurement principle thereof is based on a shape measurement by stitching using a Michelson microscope interferometer in which a high spatial resolution can be expected, and a stitching error is corrected using data of a Fizeau interferometer capable of a highly-accurate measurement in spatial wavelength ranges of intermediate to long periods. In this stitching, the degree of coincidence in a commonly measured overlapping range is used out of shape measurement data of adjacent ranges, and the inclination of adjacent measurement data is optimally corrected.

As described above, the inventors of the present invention have completed a surface processing and measurement system with nanometer precision, manufactured an X-ray focusing mirror having an accuracy of 2 nm (PV value), and have succeeded in a diffraction-limited focusing of hard X-rays at a sub-30 nm level with the SPring-8. However, although the shape measurement with stitching using the interferometer described above enables measurement of the surface shape of the focusing mirror with high accuracy, there is a drawback that collecting data takes a long period of time and data processes thereafter also takes time. Even if the shape of the focusing mirror can be measured with high accuracy using a shape measurement device using the interferometer under specific ideal conditions, the shape of a reflective surface of the focusing mirror is not ensured in a state where the focusing mirror is incorporated in an X-ray condensing device. The reason is because environment conditions such as temperature, external stress, or the like normally differ between when the shape of the focusing mirror is measured and when the X-ray condensing device is actually used. In order to achieve the most ideal focusing with diffraction limitation, it is necessary to know the shape of the reflective surface of the X-ray mirror in the incorporated state in the X-ray condensing device with high accuracy, but there has been no system of measuring the shape of the focusing mirror in the operated state in approximately real time among X-ray focusing optical systems.

One method of an imaging performance measurement of a projection lens or the like is the phase restoration method. The phase restoration method is a method that has been used mainly to improve resolution in optical systems such as an electron microscope or an astronomical telescope in which a large aberration exists. Basically, the phase distribution of an image is obtained from the intensity distribution of the image on a focus plane and a pupil plane, and the wavefront aberration of the optical system is calculated from the phase distribution (see Patent Document 2 or 3). In the normal phase restoration method, an arbitrary phase is first provided to the measured intensity distribution at the focus plane, and then a Fourier transformation is performed to obtain the complex amplitude distribution at the pupil plane. Next, out of the obtained complex amplitude distribution, a phase portion of the obtained CAD is left as it is, while only an absolute value corresponding to an intensity portion is substituted with a value according to an actual measured value (square root of the intensity at the pupil plane) to obtain a new complex amplitude distribution. The new complex amplitude distribution is subjected to an inverse Fourier transformation to obtain the complex amplitude distribution on the focus plane. Again, a phase portion is left as it is, and the intensity is substituted with an actual measured value at the focus plane. By repeating the calculation described above to cause convergence, the complex amplitude distributions at the focus plane and the pupil plane are calculated. From the phase distribution of the complex amplitude distribution at the pupil plane, the wavefront aberration of the lens can be calculated.

However, in the case where the measurement of the intensity distribution at the pupil plane is difficult such as in the photolithography, the wavefront aberration of the optical system is calculated from the optical intensity distributions of the focus plane and a defocus plane. In Patent Document 2, the optical intensity distributions on a plurality of planes orthogonal to an optical axis and in the vicinity of the focus plane are respectively measured, the optical image complex amplitude near the focus plane or near the pupil plane is obtained by the phase restoration method, and then the wavefront aberration of the projection lens is obtained. Patent Document 3 focuses on the movement time of an optical intensity distribution measurement device when measuring the optical intensity distributions of the focus plane and the defocus plane. The optical intensity distribution of the pupil plane calculated from the optical intensity distributions of the focus plane and the defocus plane measured in advance is stored, the optical intensity distribution of a plane in the vicinity of the focus plane and orthogonal to the optical axis is measured at the time of the actual measurement, the complex amplitude distribution at the pupil plane is calculated using the phase restoration method from the optical intensity distribution in the vicinity of the focus plane and the stored optical intensity distribution of the pupil plane, and the wavefront aberration of a projection optical system is calculated from the complex amplitude distribution to ensure a real-time measurement.

Patent Document 1: Japanese Unexamined Patent Publication No. 08-271697
Patent Document 2: Japanese Patent No. 3634550
Patent Document 3: Japanese Patent No. 3774588
Non-Patent Document 1: Kazuto Yamauchi, Kazuya Yamamura, Hidekazu Mimura, Yasuhisa Sano, Akihisa Kubota, Yasuhiro Sekito, Kazumasa Ueno, Alexei Souvorov, Kenji Tamasaku, Makina Yabashi, Tetsuya Ishikawa, and Yuzo Mori: Development of the Shape Measurement System with Interferometers for Ultraprecise X-ray Mirror, Journal of the Japan Society of Precision Engineering, 69, (2003), 856

DISCLOSURE OF THE INVENTION

Technical Problems to be Solved

In a processing process, the absolute accuracy of an employed shape measurement device determines the final shape accuracy of a mirror. In order to seek reduction in focusing beam diameter and a hard X-ray focusing with low energy, it is necessary to manufacture a mirror with a small curvature and a higher accuracy than 2 nm (PV value), and an improvement in the performance of a shape measuring instrument is essential. As the evaluation of the shape measuring instrument, there is an evaluation of the reproducibility and absolute accuracy. Although many of the measuring instruments have reached levels of under 1 nm regarding the reproducibility, there has been no means of evaluation regarding the absolute accuracy. Also, since the wavelength of reference light used in the shape measuring instrument greatly differ from the wavelength of an X-ray actually applied in the X-ray condensing device, measuring the shape of the focusing mirror with the shape measuring instrument does not qualify as a direct evaluation of the characteristic of an X-ray focusing optical system.

Thus, in view of the circumstance described above, an object of the present invention is to newly propose an "at-wavelength metrology" as a method of evaluating the shape accuracy of an X-ray mirror mounted to an X-ray condensing device. That is, an X-ray wavefront measurement method of obtaining the phase error distribution, i.e., the shape error, on the mirror by using the phase restoration method based on the wave optics theory, using the hard X-ray used for the actual evaluation, and using the intensity distribution of focusing beam focused by the mirror is proposed, and an X-ray condensing method of optimally adjusting an X-ray focusing optical system using the X-ray wavefront measurement method is proposed. Also, an X-ray condensing device using the phase restoration method capable of performing the shape change of a shape-changeable reflective mirror included in an X-ray focusing optical system and reducing the beam diameter of an X-ray is proposed.

Means to Solve the Problems

In order to achieve the object described above, the present invention provides an X-ray condensing method using a phase restoration method in which an X-ray is reflected and focused by a single or a plurality of X-ray mirrors having an ultraprecise reflective surface, characterized in that one of the X-ray mirrors has a wavefront adjustable function that enables a fine adjustment of a wavefront of the X-ray reflected by the reflective surface, an X-ray intensity distribution on a plane orthogonal to an optical axis in a vicinity of a focus is measured and an X-ray intensity distribution on a plane orthogonal to the optical axis in a vicinity of the reflective surface of the X-ray mirror is measured or a known X-ray intensity distribution of the incident X-ray is used to calculate a complex amplitude distribution on the reflective surface using the phase restoration method from the X-ray intensity distribution in the vicinity of the focus and the X-ray intensity distribution in the vicinity of the reflective surface, a wavefront aberration of an X-ray focusing optical system is calculated from the complex amplitude distribution, and the reflective surface of the X-ray mirror is controlled by the wavefront adjustable function such that the calculated wavefront aberration is minimized.

It is preferable that the wavefront adjustable function of the X-ray mirror be achieved by a shape changeable function that enables a change in shape of the reflective surface of the X-ray mirror, the wavefront adjustable function of the X-ray mirror be achieved by a film formation of a multilayer film formed on the reflective surface of the X-ray mirror or a film formation of an additional multilayer film formed on a multilayer film, or the wavefront adjustable function of the X-ray mirror be achieved by a shape change by an additional processing of the reflective surface of the X-ray mirror. These may also be applied in combination.

It is also preferable that the X-ray mirror having the wavefront adjustable function be an elliptical focusing mirror configuring a K-B mirror system. Alternatively, it is also preferable that the X-ray mirror having the wavefront adjustable function be a plane mirror arranged on a front side of an elliptical focusing mirror configuring a K-B mirror system.

Further, it is also preferable that the X-ray mirror having the wavefront adjustable function be a plane mirror arranged on a front side of an elliptical focusing mirror configuring a K-B mirror system, the wavefront adjustable function thereof be achieved by a shape changeable function that enables a change in shape of the reflective surface, and the shape of the reflective surface is checked with an interferometer while the shape is finely changed.

Also, in order to achieve the object, the present invention configures an X-ray condensing device using a phase restoration method in which an X-ray is reflected and focused by a single or a plurality of X-ray mirrors having an ultraprecise reflective surface, characterized by including a holder that fixes each of the X-ray mirrors and is capable of finely adjusting a posture thereof, and X-ray intensity distribution measurement means for measuring an X-ray intensity distribution on a plane orthogonal to an optical axis in a vicinity of a focus, and characterized in that one of the X-ray mirrors is a shape-changeable X-ray mirror capable of changing a shape of the reflective surface, and a wavefront aberration of an X-ray focusing optical system is minimized by performing a feedback control of arithmetic means that calculates a complex amplitude distribution at the reflective surface using the phase restoration method from a known X-ray intensity distribution on a plane orthogonal to the optical axis in a vicinity of the reflective surface of the X-ray mirror having a focusing function and the X-ray intensity distribution measured by the X-ray intensity distribution measurement means and calculates the wavefront aberration of an X-ray optical system from the complex amplitude distribution and of driver means that changes the shape of the reflective surface of the shape-changeable X-ray mirror based on a result of the arithmetic means.

It is preferable that the shape-changeable X-ray mirror be an elliptical focusing mirror configuring a K-B mirror system.

It is also preferable that the shape-changeable X-ray mirror be a plane mirror arranged on a front side of an elliptical focusing mirror configuring a K-B mirror system. Further, it is also preferable that the shape-changeable X-ray mirror be a plane mirror arranged on a front side of an elliptical focusing mirror configuring a K-B mirror system and including an interferometer capable of measuring the shape of the reflective surface in a state fixed to the holder.

In the shape-changeable X-ray mirror, a mirror surface layer formed with the reflective surface and capable of elastic deformation is stacked on a base having high shape stability with a deformation drive layer therebetween, a common electrode layer is formed on one surface and a plurality of divided drive electrode layers are formed on an alternative surface of a piezoelectric element layer in the deformation drive layer, and a controlled voltage is applied between the common electrode layer and each of the drive electrode layers from the driver means.

It is also preferable that the X-ray intensity distribution measurement means perform measurement with a wire scanning method.

Effect of the Invention

With the X-ray condensing method and its device using the phase restoration method of the present invention, the wavefront aberration of the X-ray focusing optical system, i.e., the shape error of the X-ray mirror, can be calculated completely using the phase restoration method as long as an ideal intensity distribution of a focus beam is obtainable, and an ideal focusing with diffraction limitation can be achieved by controlling the reflective surface of the X-ray mirror having the wavefront adjustable function to minimize the wavefront aberration using the result of the calculation. The wavefront error can be evaluated approximately in real time in an actual application environment merely by measuring the X-ray intensity distribution in the vicinity of the focus using the X-ray focusing optical system that actually performs the focusing and performing the calculation. That is, the absolute accuracy of the shape of the X-ray mirror can be evaluated, and a shape modification of the X-ray mirror can be performed based on data of a surface shape error of the X-ray mirror obtained by the evaluation. The method of the present invention can be applied to a multilayer mirror with high NA, and enables measurement and correction of the wavefront error that occurs due to unevenness of a multilayer film.

In the case of focusing a hard X-ray generated by the SPring-8, the X-ray intensity distribution on the plane orthogonal to the optical axis in the vicinity of the reflective surface of the X-ray mirror does not need to be measured every time since there is a complete coherent X-ray beam characteristic. Thus, the X-ray intensity distribution of the incident X-ray can be treated as a known X-ray intensity distribution, and therefore merely measuring the X-ray intensity distribution in the vicinity of the focus suffices. Also, since the algorithm of the phase restoration method is a repetition of a forward calculation and an inverse calculation, the calculation can easily be performed, and the wavefront aberration can accordingly be calculated in a short period of time.

A Fresnel-Kirchhoff diffraction integral calculation, FFT, or the like is used for the forward calculation, and a modified a Fresnel-Kirchhoff diffraction integral calculation, inverse FFT, or the like is used for the inverse calculation.

When the wavefront adjustable function of the X-ray mirror is achieved by the shape changeable function that enables the change in shape of the reflective surface of the X-ray mirror, a beam profile can be improved by instantly changing the shape of the X-ray mirror. When the wavefront adjustable function of the X-ray mirror is achieved by the film formation of the multilayer film formed on the reflective surface of the X-ray mirror, the film formation of the additional multilayer film formed on the multilayer film, or the shape change by the additional processing of the reflective surface of the X-ray mirror, data of the wavefront aberration becomes processing data with high reliability for modifying the X-ray mirror, although work is to be performed after temporarily detaching the X-ray mirror from the X-ray focusing optical system.

When the X-ray mirror having the wavefront adjustable function is the plane mirror arranged on the front side of the elliptical focusing mirror configuring the K-B mirror system and the wavefront adjustable function thereof is achieved by the shape changeable function that enables the change in shape of the reflective surface, the shape can be finely changed while the shape of the reflective surface is checked with the interferometer arranged to oppose the reflective surface of the plane mirror to enable a shape correction with high accuracy. That is, an incident X-ray that offsets the shape error of the focusing mirror or the wavefront error that occurs due to the unevenness of the multilayer film in the case of the multilayer mirror is generated by the plane mirror to create an ideal focused state of the X-ray. Since the shape can be changed while the shape is measured with the interferometer or the like in the case of the plane mirror, a more reliable wavefront correction is possible.

The wavefront correction using a shape-changeable mirror is a method often used in the range of normal lasers, but it is the first attempt in the range of X-rays. By obtaining the wavefront error on an X-ray mirror from the focused intensity distribution that is extremely sensitive to shape errors and changing the shape to improve the wavefront error, an optimum focused state is achieved. An X-ray focusing optical system or an X-ray beam may subtly change in characteristic due to the influence of temperature change or the like during use over a long period of time. The focused state can be maintained by measuring the wavefront aberration of the X-ray focusing optical system as needed in such cases as well.

BEST MODE FOR CARRYING OUT THE INVENTION

Next, an X-ray condensing method using a phase restoration method and its device of the present invention will be described in detail based on an embodiment. The present invention uses the fact that the phase error on a mirror surface can be calculated by the phase restoration method from only the focused intensity distribution of an X-ray. Generally, an X-ray mirror with high accuracy is required to be manufactured by an offline measurement and processing, and the performance of the X-ray mirror has been determined by the performance of a shape measuring instrument used therefor. From the result of a simulation, it has been found that the phase error distribution on the mirror surface can be obtained from the focused intensity distribution and that the shape distribution of the mirror can be calculated at an unprecedented 0.1 nm (PV value) accuracy level by using the phase error distribution. By combining this calculation method of the shape error of the mirror surface using the phase restoration method and an X-ray mirror that can change its shape at a nanometer level, the measured wavefront error can be modified.

Figure 1:
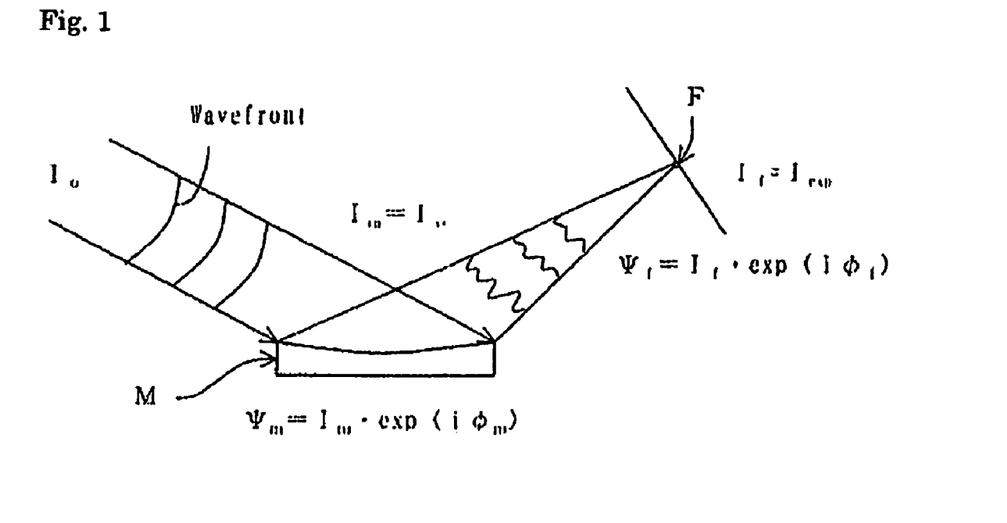
FIG. 1 is a conceptual view showing a shape calculation method for an X-ray mirror using a phase restoration method.

First, a calculation algorithm using the phase restoration method will be described. FIG. 1 shows an incident X-ray $I_0$ being reflected by a reflective surface of a focusing mirror M and focused at a focus F, and the wavefront of the incident X-ray being disturbed by the reflection. A complex amplitude distribution $\Psi_m$ of the X-ray on the reflective surface of the focusing mirror M and a complex amplitude distribution $\Psi_f$ at the focus F are shown as follows.

$$\Psi_m = I_m \cdot \exp(i\phi_m)$$

$$\Psi_f = I_f \cdot \exp(i\phi_f)$$

Figure 2:
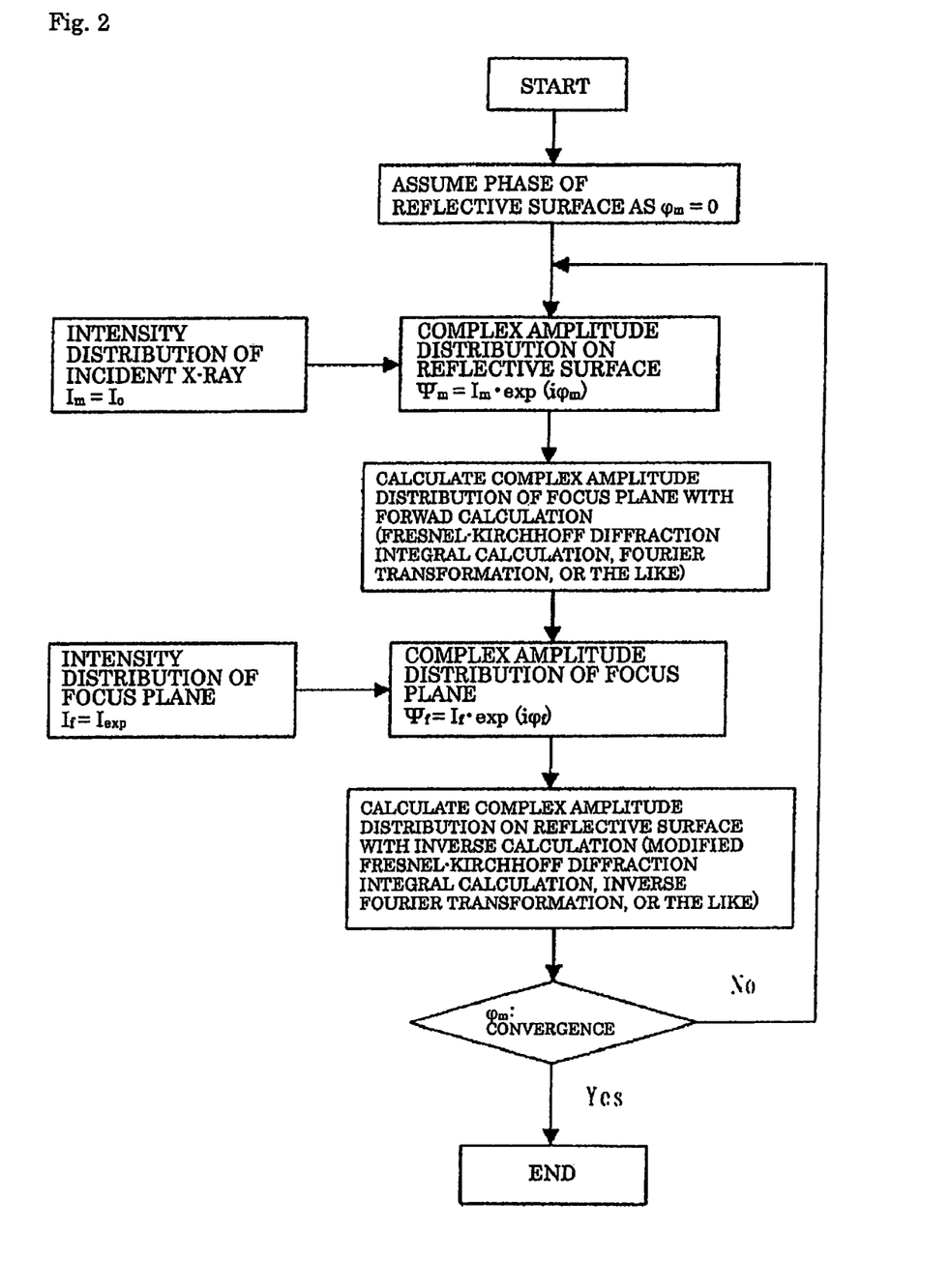
FIG. 2 is a flowchart showing a calculation algorithm of the phase restoration method.

Based on the calculation algorithm shown in FIG. 2, a calculation process of obtaining $\phi_m$ with the phase restoration method will be described briefly. The calculation algorithm itself is a conventionally know method.

(Step 1)

Assuming that a completely coherent hard X-ray is incident on the focusing mirror, the intensity $I_m$ on the reflective surface is uniform. Since phase information $\phi_m$ on the reflective surface that reflects the shape error is unknown, the phase error is assumed to be 0 in the initial setting.

$$I_m = I_0$$

$$\phi_m = 0$$

(Step 2)

A wave optics forward calculation is performed to calculate the intensity and the phase at the focus position. Specifically, the complex amplitude distribution at the focus is calculated by a Fresnel-Kirchhoff diffraction integral calculation, a Fourier transformation, or the like.

(Step 3)

In the focus position, the calculated phase $\phi_f$ is left as it is, and only the intensity $I_f$ is substituted with an actual measured value $I_{exp}$. Then, by a wave optics inverse calculation, the intensity $I_m$ and the phase $\phi_m$ on the mirror are calculated. For this calculation, a modified Fresnel-Kirchhoff diffraction integral calculation, inverse Fourier transformation, or the like is used.

(Step 4)

On the focusing mirror, the calculated phase $\phi_m$ is left as it is, and only the intensity is changed to the initial state (intensity $I_0$) to again obtain the intensity $I_f$ and the phase $\phi_f$ at the focus.

(Step 5)

Steps 3 and 4 are repeated until the changes in the phase and the intensity become constant.

The error (wavefront aberration) with respect to an ideal reflective surface shape is calculated from the phase $\phi_m$ on the reflective surface of the focusing mirror calculated in this manner.

Figure 3:
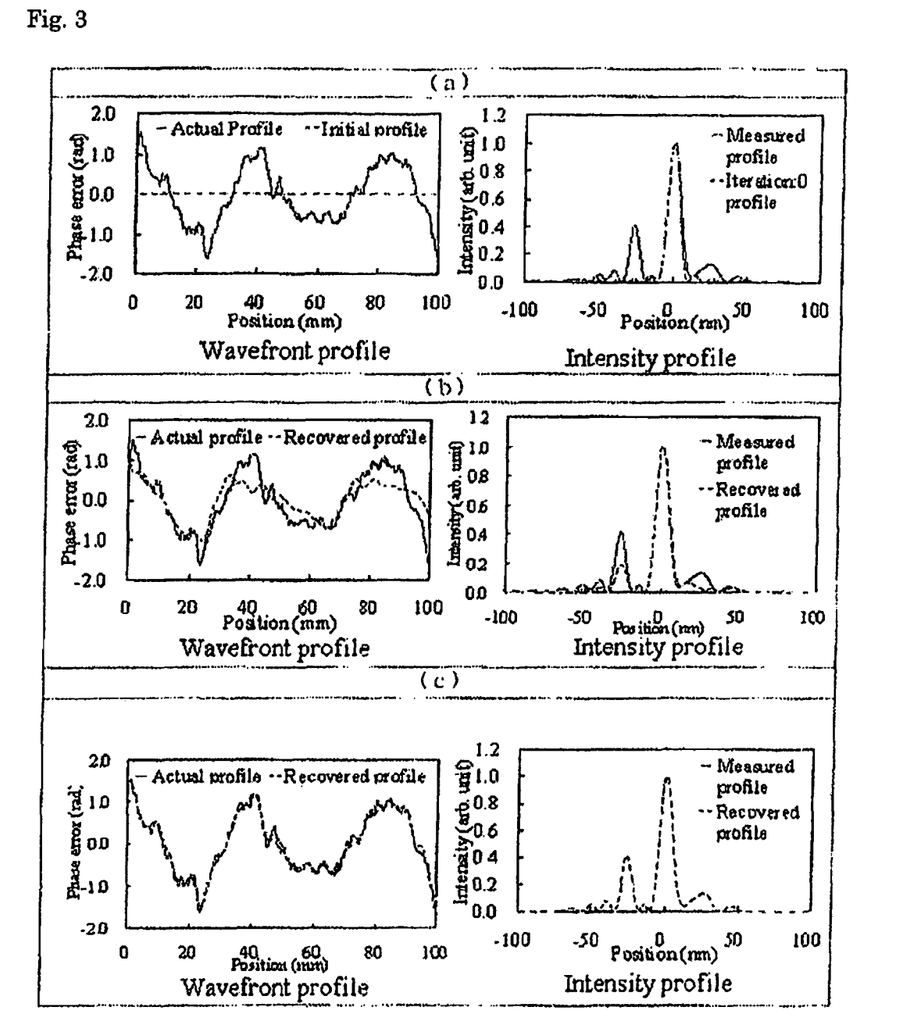
FIG. 3(a) shows the shape of the X-ray mirror and the X-ray intensity distribution at the focus determined in advance.
FIG. 3(b) shows the result of a case where the repeated number of times of the calculation by the phase restoration method is 10.
FIG. 3(c) shows the result of a case where the repeated number of times of the calculation by the phase restoration method is 1000.

FIG. 3 shows a calculation example of a calculation by a developed program. An assumed shape error was given, and an attempt was made to reversely recover the given shape error distribution from only the calculated beam intensity distribution. FIG. 3(a) shows the initial state, and the calculation is started from a state where there is no phase error distribution. FIG. 3(b) shows that, when the repeated number of times is 10, the phase error distribution has recovered to a small degree and the intensity distribution has also recovered correspondingly. FIG. 3(c) shows that, when the repeated number of times is 1000, the shape error and the intensity profile match completely. From the result, it can be found that this method is effective means of obtaining the shape error on the X-ray mirror.

Figure 4:
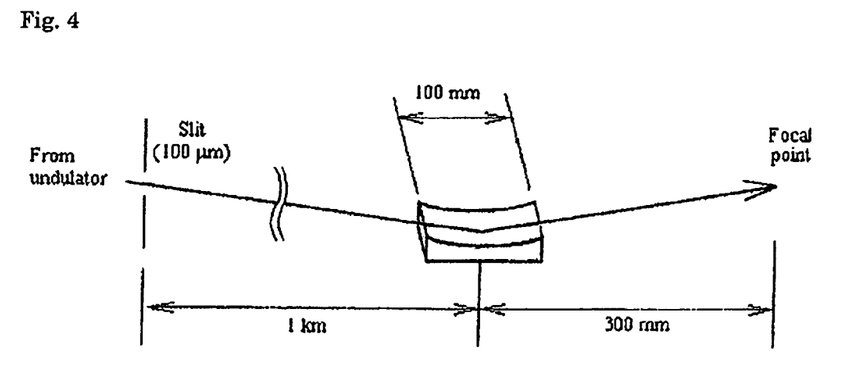
FIG. 4 is an optical arrangement view of an experiment of calculating the shape error from the intensity distribution in which light is focused with the X-ray mirror.
Figure 5:
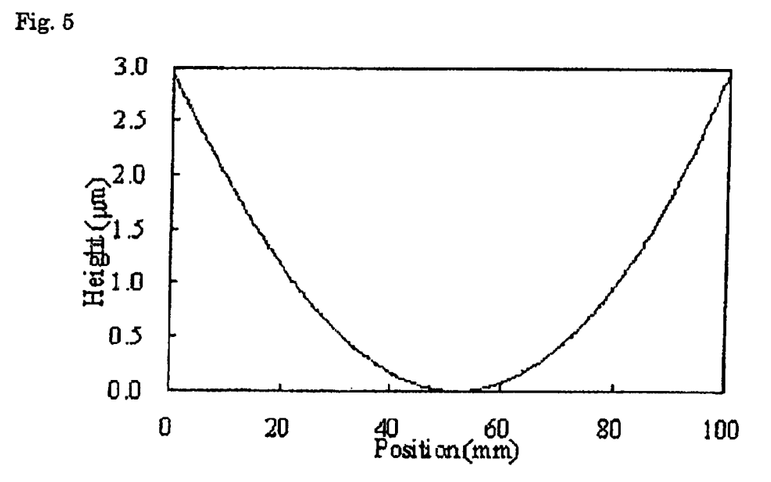
FIG. 5 is a graph showing the shape of the X-ray mirror used in FIG. 4, the abscissa representing the position and the ordinate representing the height.

Next, the determination of the shape error in the actual focusing mirror was performed. FIG. 4 shows the optical arrangements. The mirror that was used is a sub-200 nm elliptical focusing mirror. A result of an experiment of a focusing characteristic performed on a 1-km long beamline of the SPring-8 is used. FIG. 5 shows the shape of the elliptical focusing mirror. The shape is obtained from an elliptic function in which two foci are the light source and the focused point.

Figure 6:
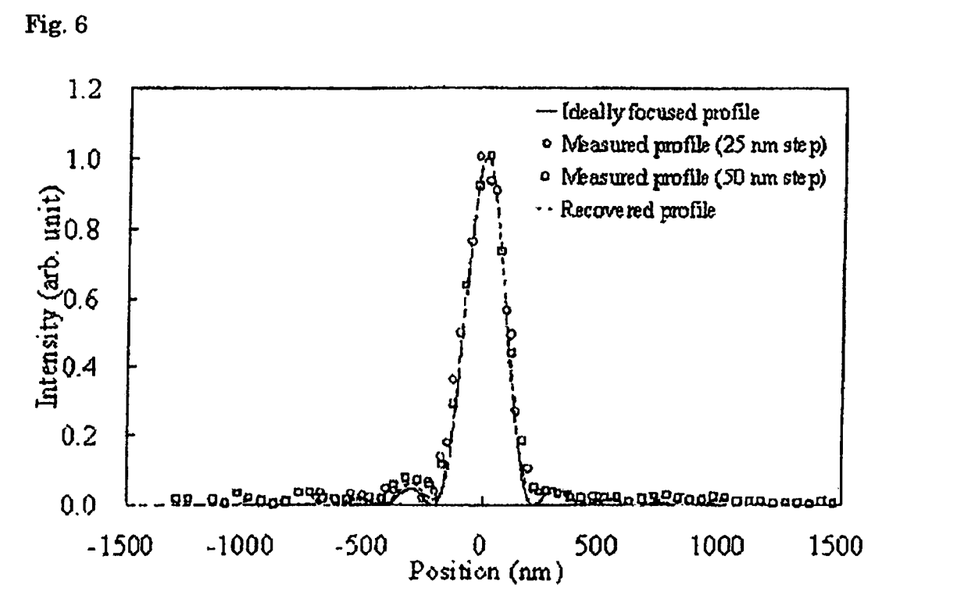
FIG. 6 is a graph showing an ideal focused intensity distribution in which the light is focused with the optical arrangement shown in FIG. 4 and the intensity distribution measured by a wire scanning method.

FIG. 6 shows an ideal focused intensity distribution and the X-ray intensity distribution on a plane orthogonal to an optical axis at the focus measured by the wire scanning method. It can be seen that, although the beam diameter matches with that of the ideal profile, there is a change in a satellite peak on the left side due to the shape error.

Figure 7:
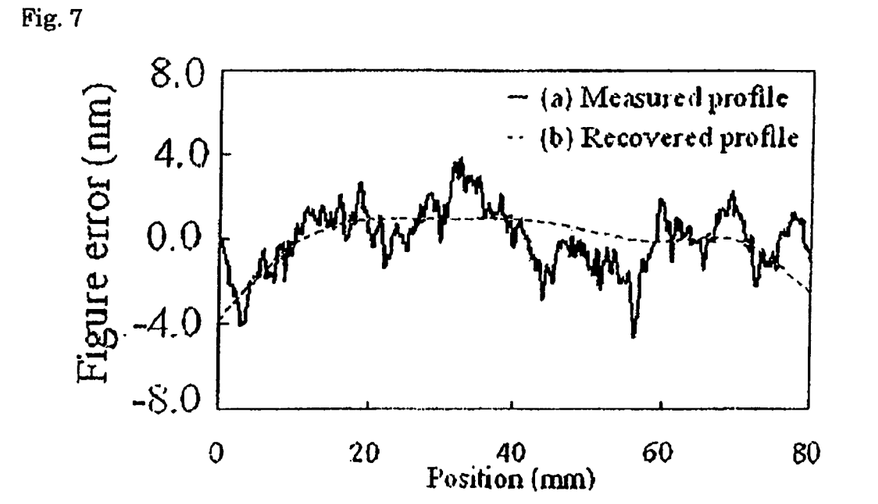
FIG. 7 is a graph showing the shape error distribution of the X-ray mirror calculated only from the X-ray intensity distribution of FIG. 6.

In FIG. 7, the shape error distribution calculated by the phase restoration method from only the X-ray intensity distribution of FIG. 6 is shown by a dotted line. In addition, a result of measurement by the MSI developed by the inventors of the present invention described above is shown by a solid line. As a result, it can be seen that the actual measured shape and the shape calculated by the phase restoration method match regarding the shape error in a long-period shape. The reason to why the error in a short period is not calculated is in the size of the range of the measured X-ray intensity distribution. If an accurate measurement of the X-ray intensity distribution is possible in a wide range, there will presumably be a match regarding the shape error in high frequency.

Next, a specific embodiment of the present invention will be described. A K-B mirror system is configured by arranging a vertical direction focusing mirror and a horizontal direction focusing mirror to be orthogonal to each other in the optical axis direction. Each focusing mirror forms an elliptical surface having the light source and the focused point as foci on the reflective surface. In the embodiment described below, only one focusing mirror forming the K-B mirror system will be used for the schematic illustration since the principles are the same.

Figure 8:
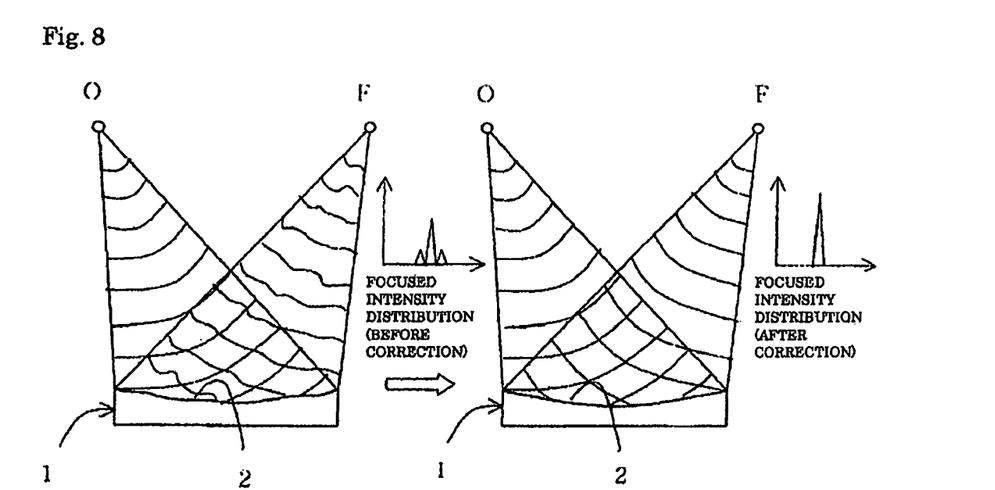
FIG. 8 is an illustrative view showing all embodiment in which an X-ray is focused using a shape-changeable X-ray mirror.

FIG. 8 shows a case where the X-ray emitted from a light source O is reflected to be focused at the focus F by a reflective surface 2 using a shape-changeable X-ray mirror 1. The state on the left side in FIG. 8 shows that there is an error in shape of the reflective surface 2 and the wavefront of the X-ray is disturbed after the reflection by the reflective surface 2. It also shows that relatively large satellite peaks exist accordingly on both sides of a low peak regarding the focused intensity distribution at the focus F. The state on the right side in FIG. 8 shows the wavefront of the X-ray after the reflection by the reflective surface 2 being modified by correcting the shape of the reflective surface 2 of the shape-changeable X-ray mirror 1 based on shape error data of the reflective surface 2 calculated by the phase restoration method, and shows that only a high peak accordingly appears in the focused intensity distribution at the focus F.

Figure 9:
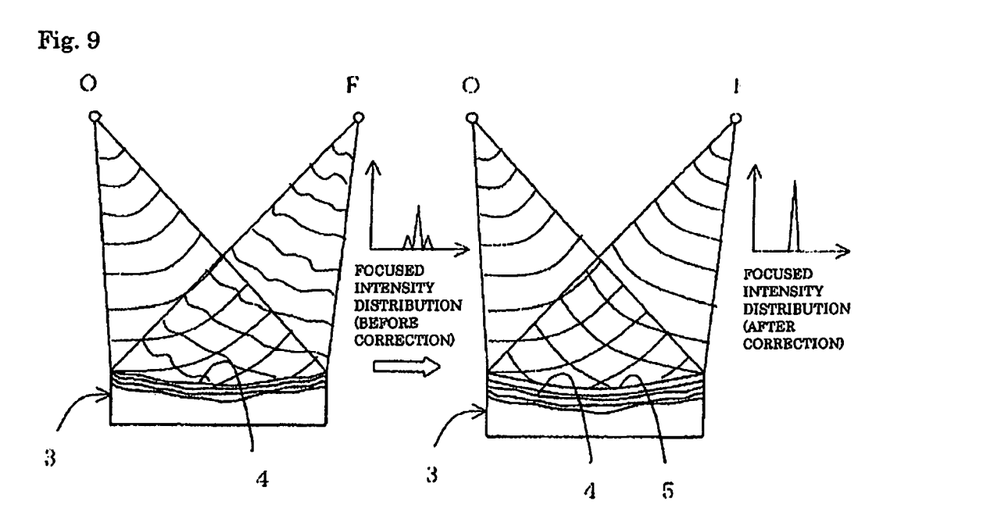
FIG. 9 is an illustrative view showing an embodiment in which an X-ray is focused using a multilayer focusing mirror.

FIG. 9 shows a case where the X-ray emitted from the light source O is reflected to be focused at the focus F by a multilayer surface 4 using a multilayer focusing mirror 3. The state on the left side in FIG. 9 shows that there is unevenness in the multilayer surface 4 and the wavefront of the X-ray is disturbed after the reflection by the multilayer surface 4. It also shows that relatively large satellite peaks exist accordingly on both sides of a low peak regarding the focused intensity distribution at the focus F. The state on the right side in FIG.

9 shows the wavefront of the X-ray after the reflection by the multilayer surface 4 and an additional multilayer surface 5 being modified by forming the additional multilayer surface 5 on the multilayer focusing mirror 3 to perform correction based on wavefront aberration data calculated by the phase restoration method, and shows that only a high peak accordingly appears in the focused intensity distribution at the focus F. The multilayer surface 4 or the additional multilayer surface 5 of the multilayer focusing mirror 3 is Si, Mo, or the like alternately stacked in predetermined thicknesses.

Figure 10:
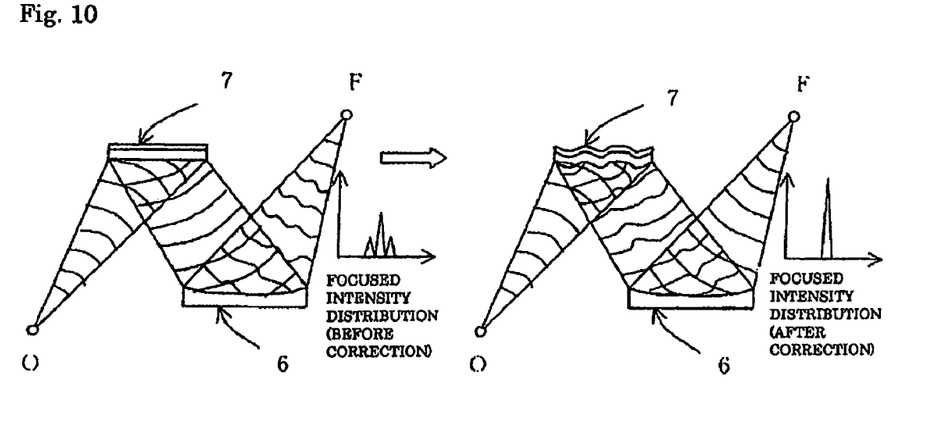
FIG. 10 is an illustrative view showing an embodiment in which the wavefront aberration of an X-ray focusing optical system is corrected with a shape-changeable X-ray mirror arranged on the front side of an elliptical focusing mirror.

FIG. 10 shows a method of correcting the wavefront aberration of the X-ray focusing optical system with a shape-changeable plane mirror 7 arranged on the front side of an elliptical focusing mirror 6. In this case, the elliptical focusing mirror 6 is not a shape-changeable X-ray mirror. The state on the left side in FIG. 10 shows the X-ray emitted from the light source O and reflected by the shape-changeable plane mirror 7 being focused at the focus F by the elliptical focusing mirror 6. It also shows that the wavefront of the X-ray after the reflection by a reflective surface is disturbed due to the shape error of the reflective surface of the elliptical focusing mirror 6 in this case, and that relatively large satellite peaks exist accordingly on both sides of a low peak regarding the focused intensity distribution at the focus F. The state on the right side in FIG. 10 shows that the wavefront reflected by the elliptical focusing mirror 6 being modified by correcting the shape of the reflective surface of the shape-changeable plane mirror 7 based on wavefront aberration data calculated by the phase restoration method and thus changing the wavefront of the X-ray after the reflection by the reflective surface, and shows that only a high peak accordingly appears in the focused intensity distribution at the focus F.

Figure 11:
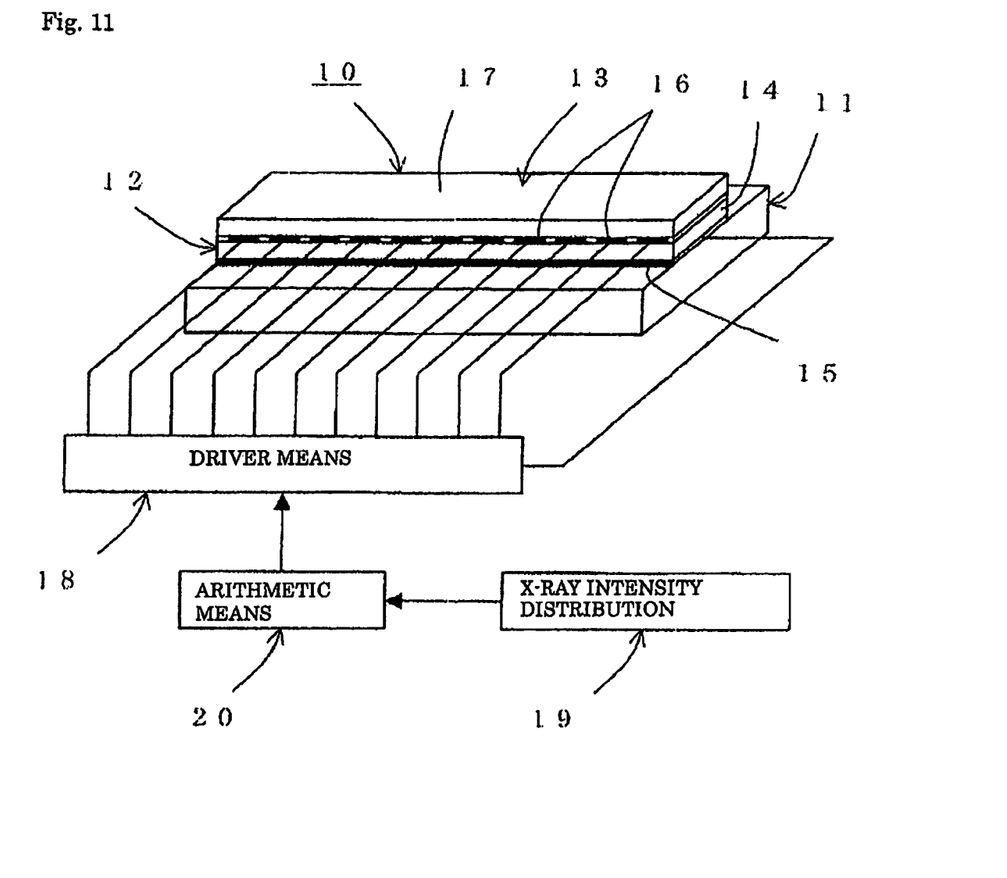
FIG. 11 is a brief illustrative view showing the specific structure of the shape-changeable X-ray mirror and a control system thereof.

FIG. 11 shows the specific structure of a shape-changeable X-ray mirror 10. In the shape-changeable X-ray mirror 10, a mirror surface layer 13 formed with a reflective surface 17 and capable of elastic deformation is stacked on a base 11 having high shape stability with a deformation drive layer 12 therebetween. In the deformation drive layer 12, a common electrode layer 15 is formed on one surface of a piezoelectric element layer 14 and a plurality of divided drive electrode layers 16 are formed on the other surface. A controlled voltage is applied between the common electrode layer 15 and the each of the drive electrode layers 16 from the driver means 18. By applying the voltage between the common electrode layer 15 and the each of the drive electrode layers 16, a specific range of the sandwiched piezoelectric element layer 14 is deformed, and the deformation causes a change in the shape of the mirror surface layer 13.

By using X-ray intensity distribution measurement means 19 to measure the X-ray intensity distribution on the plane orthogonal to the optical axis in the vicinity of the focus, using arithmetic means 20 to calculate the known X-ray intensity distribution at the plane orthogonal to the optical axis in the vicinity of the reflective surface 17 of the shape-changeable X-ray mirror 10 having the focusing function and the complex amplitude distribution at the reflective surface using the phase restoration method from the X-ray intensity distribution measured with the X-ray intensity distribution measurement means 19 and to also calculate the wavefront aberration of the X-ray optical system from the complex amplitude distribution, and performing a feedback control of the driver means 18 that changes the shape of the reflective surface 17 of the shape-changeable X-ray mirror 10 based on the result of the arithmetic means 20, the wavefront aberration of the X-ray focusing optical system is minimized. As the X-ray intensity distribution measurement means 19, a measurement device is used with the wire scanning method.

INDUSTRIAL APPLICABILITY

Among analysis techniques using radiation light, many of the analysis techniques require X-ray focusing beams. By using the present invention, the performance of an X-ray mirror manufactured by currently state-of-the-art processing/measurement techniques can be improved progressively. Since an X-ray nanobeam can be formed, a nano fluorescent X-ray analysis, a nano X-ray diffraction, or the like using the X-ray nanobeam can be easily realized, and further an X-ray microscope can be constructed.

BRIEF DESCRIPTION OF DRAWINGS

FIGS. 3(a) to 3(c) show simulation results in which the shape of the X-ray mirror and an X-ray intensity distribution at the focus are given and the shape error is calculated from the X-ray intensity distribution.

BRIEF DESCRIPTION OF NUMERALS

M Focusing mirror
O Light source
F Focus
1 Shape-changeable X-ray mirror
2 Reflective surface
3 Multilayer focusing mirror
4 Multilayer surface
5 Additional multilayer surface
6 Elliptical focusing mirror
7 Shape-changeable plane mirror
10 Shape-changeable X-ray mirror 11 Base
12 Deformation drive layer
13 Mirror surface layer
14 Piezoelectric element layer
15 Common electrode layer
16 Drive electrode layer
17 Reflective surface
18 Driver means
19 X-ray intensity distribution measurement means
20 Arithmetic means

The invention claimed is:

1. An X-ray condensing method using a phase restoration method, comprising the steps of:
    configuring K-B mirror system having an ultraprecise reflective surface by arranging a vertical direction elliptical focusing mirror and a horizontal direction elliptical focusing mirror to be orthogonal to each other in the optical axis direction,
    arranging a shape-changeable plane mirror having a shape changeable function of a reflective surface in correspondence to the elliptical focusing mirror performing wavefront correction on a front side of said elliptical focusing mirror,
    reflecting and focusing hard X-rays by each elliptical focusing mirror, said hard X-rays being reflected by said shape-changeable plane mirror,
    measuring an X-ray intensity distribution on a plane orthogonal to an optical axis in a vicinity of a focus,
    measuring an X-ray intensity distribution of the incident X-ray on a plane orthogonal to the optical axis in a vicinity of the reflective surface of the X-ray mirror,
    calculating a complex amplitude distribution on the reflective surface using the phase restoration method from the X-ray intensity distribution in the vicinity of the focus and the X-ray intensity distribution of the incident X-ray,
    calculating a wavefront aberration of an X-ray focusing optical system from the complex amplitude distribution, and
    controlling a shape of the reflective surface of said shape changeable plane mirror such that the calculated wavefront aberration is minimized.

2. The X-ray condensing method using the phase restoration method according to claim 1, wherein, in the X-ray mirror having the shape changeable function, a mirror surface layer formed with the reflective surface and capable of elastic deformation is stacked on a base having high shape stability with a deformation drive layer therebetween, a common electrode layer is formed on one surface and a plurality of divided drive electrode layers are formed on an alternative surface of a piezoelectric element layer in the deformation drive layer, and a controlled voltage is applied between the common electrode layer and each of the drive electrode layers from the driver means.

3. The X-ray condensing method using the phase restoration method according to claim 2,
    further comprising the step of checking a shape of the reflective surface of the plane mirror with an interferometer while finely changing the shape.

4. The X-ray condensing method using the phase restoration method according to claim 1,
    further comprising the step of checking a shape of the reflective surface of the shape-changeable plane mirror with an interferometer while finely changing the shape.

5. An X-ray condensing device using a phase restoration method in which
    K-B mirror system having an ultraprecise reflective surface is configured by arranging a vertical direction elliptical focusing mirror and a horizontal direction elliptical focusing mirror to be orthogonal to each other in the optical axis direction, and a hard X-ray is reflected and focused by each elliptical focusing mirror comprising:
    a shape-changeable plane mirror having a shape changeable function of a reflective surface in correspondence to the elliptical focusing mirror performing wavefront correction arranged on a front side of said elliptical focusing mirror;
    X-ray focusing optical system wherein X-ray reflected by said shape-changeable plane mirror is focused on a focus by said elliptical focusing mirror;
    a holder that fixes each of the X-ray mirrors and is capable of finely adjusting a posture thereof;
    X-ray intensity distribution measurement means for measuring an X-ray intensity distribution on a plane orthogonal to an optical axis in a vicinity of a focus, and further comprising
    a means for minimizing a wavefront aberration of an X-ray focusing optical system by performing a feedback control, comprising:
    an arithmetic means that calculates a complex amplitude distribution at the reflective surface using the phase restoration method from a known X-ray intensity distribution on a plane orthogonal to the optical axis of the incident X-ray and the X-ray intensity distribution measured by the X-ray intensity distribution measurement means and calculates the wavefront aberration of an X-ray optical system from the complex amplitude distribution and
    a driver means that changes the shape of the reflective surface of the shape-changeable plane mirror based on a result of the arithmetic means.

6. The X-ray condensing device using the phase restoration method according to claim 5,
    wherein the shape-changeable plane mirror comprises an interferometer capable of measuring the shape of the reflective surface in a state fixed to the holder.

7. The X-ray condensing device using the phase restoration method according to claim 6,
    wherein, in the shape-changeable plane mirror, a mirror surface layer formed with the reflective surface and capable of elastic deformation is stacked on a base having high shape stability with a deformation drive layer therebetween, a common electrode layer is formed on one surface and a plurality of divided drive electrode layers are formed on an alternative surface of a piezoelectric element layer in the deformation drive layer, and further comprising:
    a means for applying a controlled voltage between the common electrode layer and each of the drive electrode layers from the driver means.

8. The X-ray condensing device using the phase restoration method according to claim 5, wherein the X-ray intensity distribution measurement means performs measurement with a wire scanning method.

9. The X-ray condensing device using the phase restoration method according to claim 5, wherein the shape-changeable plane mirror comprises:
    a mirror surface layer formed with the reflective surface and capable of elastic deformation stacked on a base having high shape stability with a deformation drive layer therebetween, a common electrode layer formed on one surface and a plurality of divided drive electrode layers formed on an alternative surface of a piezoelectric element layer in the deformation drive layer, and a means for applying a controlled voltage between the common electrode layer and each of the drive electrode layers from the driver means.

* * * * *